United States Patent [19]
Takeuchi et al.

[11] Patent Number: 4,824,617
[45] Date of Patent: Apr. 25, 1989

[54] METHOD FOR MANUFACTURING PLASTIC FOAM

[75] Inventors: Shin Takeuchi; Isamu Eto; Taketoshi Yamada, all of Anjyo, Japan

[73] Assignee: Inoue MTP Kabushiki Kaisha, Nagoya, Japan

[21] Appl. No.: 62,972

[22] Filed: Jun. 17, 1987

[30] Foreign Application Priority Data

Jul. 30, 1986 [JP] Japan .................. 61-179383

[51] Int. Cl.⁴ .................. C08J 9/06; B29C 65/04; B29C 39/10; B29C 67/22

[52] U.S. Cl. .................. 26.4/26; 249/78; 249/161; 264/45.5; 264/54; 264/55; 264/DIG. 60; 425/174.8 E; 425/417; 425/817 R

[58] Field of Search .................. 264/26, 55, DIG. 60, 264/54, 25, 45.5; 249/78, 161; 425/174.8 E, 417, 817 R

[56] References Cited

U.S. PATENT DOCUMENTS

| | | | |
|---|---|---|---|
| 2,297,022 | 9/1942 | Pfleumer | 264/55 X |
| 2,374,233 | 4/1945 | Pfleumer | 264/54 X |
| 2,458,864 | 1/1949 | Lindsay | 264/25 X |
| 2,525,965 | 10/1950 | Smith | 264/55 |
| 2,763,897 | 9/1956 | Gates et al. | 264/55 |
| 2,769,205 | 11/1956 | Pfleumer | 264/55 |
| 2,901,446 | 8/1959 | Hawkins | 264/54 X |
| 2,966,469 | 12/1960 | Smythe et al. | 264/26 |
| 3,003,192 | 10/1961 | Pfleumer | 264/55 |
| 3,265,785 | 8/1966 | Rainer | 264/54 X |
| 3,818,086 | 6/1974 | Stastny et al. | 264/54 X |
| 4,073,844 | 2/1978 | Wada et al. | 264/55 |
| 4,293,511 | 10/1981 | Vernon | 264/55 |
| 4,524,037 | 6/1985 | Marc | 264/26 |

FOREIGN PATENT DOCUMENTS

2302870 7/1973 Fed. Rep. of Germany ........ 264/55
57-170727 10/1982 Japan .

*Primary Examiner*—Philip Anderson
*Attorney, Agent, or Firm*—Armstrong, Nikaido, Marmelstein & Kubovcik

[57] ABSTRACT

A method for manufacturing a plastic foam, wherein a plastic compound with chemical foaming agent is charged in molding cavity which is defined by a pair of upper and lower die cavities and wherein the plastic compound is subject to a dielectric heating, so that the chemical foaming agent decomposes. One of the cavity surfaces is movable to vary the volume of the molding cavity in accordance with the expansion of the plastic compound, so that the movable cavity surface is kept in contact with the plastic compound which expands during heating.

5 Claims, 3 Drawing Sheets

METHOD FOR MANUFACTURING PLASTIC FOAM

BACKGROUND OF THE INVENTION

1. Field of the Invention

The present invention relates to a method for manufacturing a plastic foam, and more precisely it relates to a method for manufacturing a plastic foam by a dielectric heating.

2. Description of the Related Art

Various methods for manufacturing a plastic foam are known. The assignee of the present application has proposed an improved method for manufacturing a plastic foam in Japanese Unexamined Patent Publication (Kokai) No. 57-170727 in which a plastic material having a polar group, such as polyvinyl chloride or the like, which has a specific electrical property of a large dielectric loss factor (tan$\delta$) is premixed with a chemical foaming agent which produces a gas when it decomposes, and the mixture is placed in a predetermined shape of a molding cavity defined by a pair of dies with electrodes.

The mixture is then subjected to dielectric heating to melt the polyvinyl chloride (dielectric) or the like and to decompose the chemical foaming agent in order to obtain a formed product having a predetermined shape.

In the manufacturing method disclosed in the aforementioned publication, a large dielectric loss of the dielectric, such as polyvinyl chloride having a polar group takes place in an alternating current electric field, particularly in a high frequency electric field, so that the dielectric produces heat. Accordingly, when the plastic material such as polyvinyl chloride is put in the molding cavity of a pair of dies which is made of a material having a small dielectric loss to apply a high frequency voltage to the plastic material through the molding dies, the polyvinyl chloride or the like is heated and becomes molten, so that the plastic material is deformed into a predetermined shape corresponding to the shape of the molding cavity. Namely, the manufacturing method is characterized by the utilization of a self-exothermic property of the dielectric, such as polyviyl chloride. In other words, the manufacturing method mentioned above is clearly distinguished from a conventional compression molding in which molding dies are heated by an outside heater, so that a material in a molding cavity can be heated by the heat transmitted to the molding dies to form a predetermined shape of mold products. Accordingly, the molding method disclosed in the publication mentioned above has a higher heat efficiency than the conventional compression molding, and in particular a center portion (core) of the plastic material can be effectively heated, in comparison with a circumferential portion thereof.

A plastic foam obtained by the improved manufacturing method disclosed in the prior application has a core consisting of highly expanded cellular member and an outer or a skin shell consisting of high density layer, since the foaming agent contained in the skin shell is decomposed with the liberation of gas, by application of a high frequency voltage and the center portion of the plastic material is more effectively heated, and expanded as mentioned above. With the cellular construction mentioned above, the plastic foam can be advantageously used to form moldings for automobiles, such as decorative and protective elongated moldings which are applied to side panels and door panels of the automobiles and which must be light, decorative and shock-absorptive.

In the molding process mentioned above, a volumetric expansion of the polyvinyl chloride material due to the decomposition of the chemical foaming agent takes place. Accordingly, it is necessary to provide an air gap between the plastic material and a cavity surface of the upper die in the molding cavity in order to accomodate the expansion. However, it is known that such an air gap between the raw material, such as polyvinyl chloride which is charged in a lower molding die and an upper molding die to accomodate the expansion, decreases the actual voltage applied to the raw material in comparison with the voltage which is produced by and between the electrodes.

It should be recalled that a heat value of an object to be heated by the dielectric heating (the foaming raw material, such as polyvinyl chloride resin in the embodiment of the present invention) is in proportion to a square of the voltage actually applied thereto. Therefore, in a method which provides an air gap between the raw material charged in a lower die and a cavity surface of the upper die, the foaming raw material can be slowly heated, supposing that the voltage between the electrodes and the frequency thereof are constant. This results in a long time for heating the raw material to a predetermined temperature which is necessary for melting the material and for decomposing the foaming agent contained therein.

It is, therefore, necessary to apply a higher voltage to the foaming raw material in order to reduce the heating time. An increased voltage, however, raises another problem particularly in a dielectric heating molding method mentioned above in which an air gap which tends to become large in order to produce a plastic foam having a higher foaming ratio is provided between the foaming raw material charged in the lower die and the upper die. Namely, since the intensity of the electric field in the air gap is getting large in proportion to the increase of the voltage applied to the electrodes, there is a possibility that an electric discharging takes place between the surface of the foaming raw material and the upper die. This makes it impossible to largely increase the voltage between the electrodes.

Under these circumstances, it is preferable not to provide an air gap or to provide a slight air gap between the foaming raw material and the upper die. The absence of the gap or the slight gap, however, restricts the foaming ratio to a small value, which is contrary to a desire to produce plastic foam products having a high foaming ratio.

As mentioned before, moldings for automobiles must be light and highly decorative and protective. In general, the moldings for automobiles are shaped to have opposite ends of a stream line shape like a projectile and different sectional shapes in their longitudinal directions mainly for the purpose of decoration. Such highly decorative and light moldings having a high foaming ratio can not be produced by the prior art method mentioned above.

The primary object of the present invention is, therefore, to provide an improved method for manufacturing a plastic foam which has a large foaming ratio in a dielectric heating process.

Another object of the present invention is to provide a novel method for manufacturing a plastic foam in a dielectric heating process, with an increased energy transmission efficiency.

Still another object of the present invention is to provide a method for manufacturing a predetermined shape of plastic foam, in which not only a preformed foaming material having a foaming agent mixed therewith but also a powdery, granular or liquid foaming material having a foaming agent mixed therewith can be used as a raw material.

Still another object of the present invention is to provide a method for manufacturing a plastic foam which has a core having a large foaming ratio and a dense or solid outer shell having a small foaming ratio.

In order to achieve the objects mentioned above, according to the present invention, there is provided a method for manufacturing a predetermined shape of plastic foam, wherein a plastic compound with a chemical foaming agent is charged in a molding cavity which is defined by a pair of opposed split cavity surfaces and the plastic compound is subject to a dielectric heating to plasticize and melt it and to decompose the chemical foaming agent, characterized in that one of the cavity surfaces is movable relative to the other cavity surface to vary the volume of the molding cavity, in accordance with the expansion of the plastic compound in the molding cavity during heating, so that the plastic compound is kept in contact with the cavity surfaces without an air gap between the plastic compound and the cavity surfaces during the expansion of the plastic compound due to the dielectric heating.

The movement of the movable cavity surface is effected either by the expansion of the plastic compound or by an actuator operatively connected to the movable cavity surface.

According to the manufacturing method of the present invention as mentioned above, a high frequency voltage is applied to a dielectric (object) to be heated which is located between the electrodes. It should be born in mind that the heat value of the dielectric object is in proportion to a square of the voltage which is actually applied to the dielectric, and the actual voltage applied to the dielectric is approximately in inverse proportion to a distance of the air gap, if any, between the dielectric and the electrodes, so that the heat value becomes small as the air gap increases. Since one of the cavity surfaces of split type molding dies having high frequency electrodes is movable, the plastic compound with a foaming agent mixed therein is charged in the molding cavity and held between the cavity surfaces of the molding dies, without a gap between the electrodes exactly speaking, the cavity surfaces and the plastic compound. With this arrangement, the voltage produced by and between the electrodes can be substantially directly applied to the plastic compound to be heated, so that the plastic compound is molten and plasticized. When the plastic compound is plasticized, the chemical foaming agent incorporated in the plastic compound decomposes and produces a gas to expand the plastic compound. By retracting the movable cavity surface in accordance with the expansion of the plastic compound, the plastic compound can be substantially kept in surface contact with the cavity surfaces, so that the high frequency voltage continues to be effectively applied to the plastic compound. This results in a production of a predetermined shape of molded product in a short space of time. Since the plasticization and the expansion of the plastic compound take place as a result of a self-exothermic function due to the dielectric operation of the high frequency voltage, the molded product has a core having a larger foaming ratio in comparison with the remaining portion thereof.

Preferably, the movable cavity surface continuously receives a back pressure acting in the opposite direction, so that it is retracted against the back pressure so as to come into contact with the plastic compound charged in the molding cavity. This enables the cells of the outer shell of the foaming plastic compound to be destroyed by the expansion pressure during the expansion thereof, so that the solid outer shell has a small foaming ratio.

When a granular or powdery plastic foaming raw material (plastic compound) is used, the air between the grains or particles is discharged therefrom by the gas produced by the chemical foaming agent at the initial stage of the decomposition of the foaming agent, so that the spaces between the grains or particles contribute to a developed formation of the cell construction of the product.

Thus, according to the present invention, the molded products have a larger foaming ratio at their cores and have an increased foaming ratio as a whole, in comparison with the molded products obtained by the prior art.

BRIEF DESCRIPTION OF THE DRAWINGS

The invention will be described below in detail with reference to the accompanying drawings, in which.

DESCRIPTION OF PREFERRED EMBODIMENTS

Figure 1:
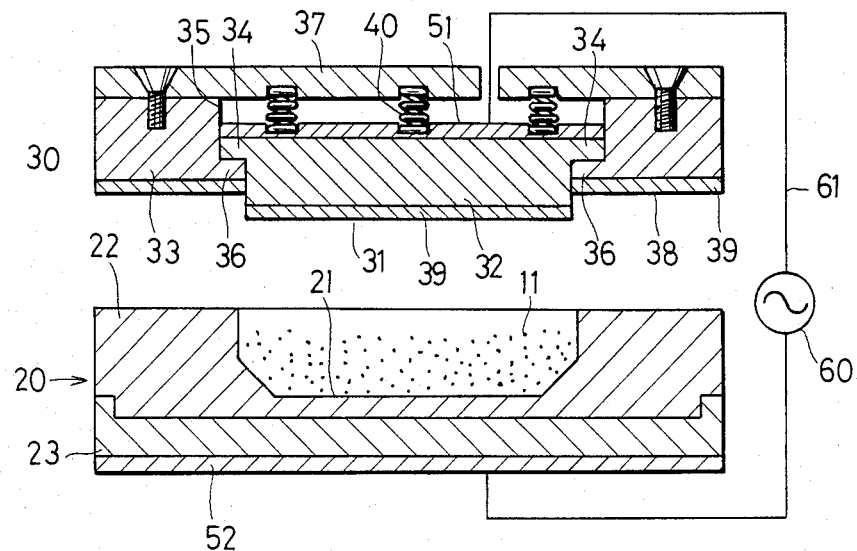
FIG. 1 is a sectional view of split type molding dies used in the present invention, shown in an open position.
Figure 5:
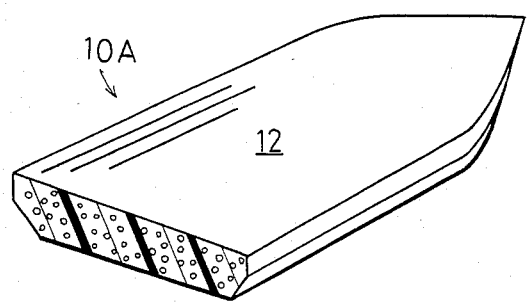
FIG. 5 is perspective view from back, of one end portion of a plastic molding obtained by the present invention; and, FIG. 6 is a perspective view from back, of one end portion of another plastic molding obtained by the present invention.

In FIG. 1, a molding device used to produce a molding 10A for an automobile as shown in FIG. 5 has a lower die 20 and an upper die 30. The lower and upper dies 20 and 30 have cavity surfaces 21 and 31, respectively. The upper die 30 is composed of a movables portion 32 and a die body 33. The movable portion 32 is provided, on its opposite sides, with shoulder portions 34 which are slidably guided up and down by corresponding guide surfaces 35 of the upper die 30. The downward displacement of the movable portion 32 is restricted by abutments 36 which project toward the movable portion 32 from the upper die body 33. The width of the projection of the movable portion 32 that projects downward from the upper die body 33 is slightly smaller than the width of the opening of the lower die 20 defined by the cavity surface 21.

Springs 40 are arranged between the movable portion 32 and a back plate 37 secured to the upper die body 33 to continuously bias the movable portion 32 toward the lower die 20. The distance between the back plate 37 of the upper die body 33 and the movable portion 32 is determined in accordance with the shape of the molding 10A to be produced and particularly the rear surface shape of the molding 10A. In the illustrated embodiment, the distance is identical to the length of the projecting portion of the movable portion that projects from the die body 33 toward the lower die 20. Namely, when the movable portion 32 is retracted most in the die body 33, the cavity surface 31 of the movable portion 32 is flush with a parting plane 38 of the upper die 30.

An upper electrode 51 is mounted to the rear face of the movable portion 32 and is electrically connected to a high frequency generator 60 by means of a conductor which extends through the back plate 37 or the die body 33. The die body 33 and the movable portion 32 are made of metal, such as aluminium, so that when the electrode 51 is energized, the die body 33 and the movable portion 32 also searve as an upper electrode. The cavity surface 31 of the movable portion 32 opposed to the lower die 20 and a surface layer 39 of the parting plane 38 of the upper die body 33 are made of a material having a small dielectric loss, such as silicon resin, fluoroplastics or the like.

On the other hand, the lower die 20 has a lower die body 22 which is preferably made of a material having a small dielectric loss, such as silicon resin or fluoroplastics or the like and which defines the lower cavity surface 21. The lower die body 22 is reinforced at its back surface away from the upper die 30, by a die frame 23 which is made of metal, such as aluminium. To a back face of the die frame 23 is mounted a lower electrode 52 which is electrically connected to the high frequency generator 60 by means of the conductor 61, similarly to the upper electrode 51.

Figure 2:
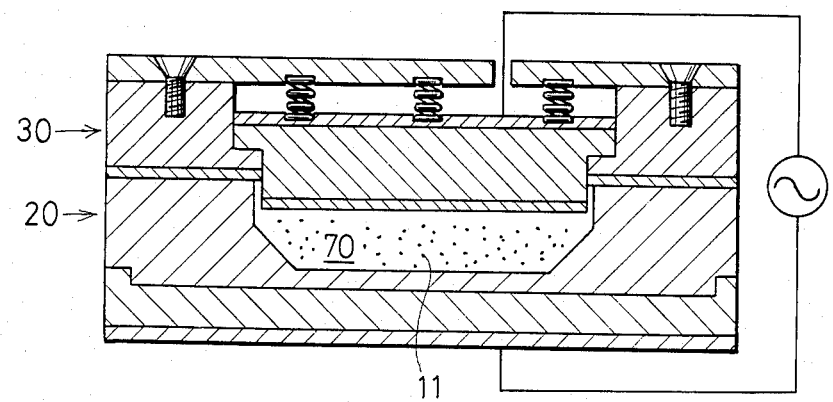
FIG. 2 is a sectional view of the molding dies shown in a closed position.

When the upper and lower dies 30 and 20 are brought into a closed position in which they contact with each other, as shown in FIG. 2, a predetermined shape of molding cavity 70 is formed therebetween. The plastic compound 11 of which the molding (product) is made is charged in the molding cavity 70. The plastic compound 11 is composed of one or more plastics having a polar group as a main part, such as polyvinyl chloride or its copolymer and at least a chemical foaming agent which is mixed in the plastic which produces a gas when it decomposes.

In case where the plastic is polyvinyl chloride, various stabilizing agents, plasticizers, coloring agents can be incorporated in the plastic, in view of physical and chemical properties necessary for the products, for example, decorative and protective moldings for automobiles.

The plastic compound can be made of a powdery or granular (pellet) material, or a plate- or bar-like piece which is preformed into a desired shape, or liquid or paste material which is dissolved or dispersed in a liquid, such as plasticizers. Among them, the powdery or pellet material is advantageous, since there is a large number of air spaces between the particles forming the material, so that the air spaces can form a core of the cell construction of the foam.

As the chemical foaming agent referred to above can be advantageously used azocompounds which produce nitrogen gas, such as azodicarbonamide, azobisformamide, azobisisobutylene nitrile, or hydrazide compound represented by P,P'-oxybisbenzene sulfonyl hydrazide, or nitroso compounds represented by N,N'-dinitroso pentamethylene tetramine, or carbonates or dicarbonates which produce carbon dioxide gas, in case of a basic material (base plastic) of the plastic compound being polyvinyl chloride (PVC).

The admixing ratio of the chemical foaming agent is determined in accordance with a desired foaming ratio. Preferably, the chemical foaming agent is admixed in a uniformly dispersed state into the powdery, granular, or bar-like etc. plastic compound when the latter is compounded or prepared. Alternatively, if the powdery or granular plastic compound consists of fine particles, the foaming agent may be sprinkled with the plastic compound.

The following discussion will be directed to how the molding for an automobile can be manufactured from the plastic compound 11.

In FIG. 1, a predetermined amount of plastic compound 11 is charged in the cavity defined in the lower cavity surface 21 of the lower die 20. It can be easily understood that if the compound 11 is powdery or granular, the compound 11 should be raised rather than being flush with the upper surface of the lower die 20, in view of a small apparent bulk density thereof.

After that, the upper die 30 is put on the lower die 20 to define a closed molding cavity 70. Preferably, in the closed position of the upper and lower dies 30 and 20, the cavity surface 31 of the upper die 30 comes into contact with the upper surface of the charged compound 11 so as to slightly press the compound downward.

Then, the high frequency voltage which is generated by the high frequency generator 60 is applied to the plastic compound 11 by the electrodes 51 and 52. As a result of the application of the high frequency voltage to the plastic compound 11, the latter is subject to the dielectric heating and is molten. During the dielectric heating of the plastic compound 11, the applied voltage can be directly used to heat the plastic compound, since the plastic compound 11 comes into contact with the cavity surfaces 31 and 21 of the upper and lower dies 30 and 20, as mentioned above. By the dielectric heating, the chemical foaming agent decomposes and produces the gas, thus resulting in the formation of the plastic cell construction. When the plastic compound 11 is powdery or granular, the air existing between the particles is discharged therefrom by the decomposing gas which is produced at the initial stage of the decomposition of the foaming agent. Namely, the air between the particles is replaced with the decomposing gas. The decomposing gas with which the air is replaced is caught by and in the molten plastic material and accordingly also contributes to a formation of the cells. The core portion of the plastic compound 11 is heated more effectively than the circumferential portion thereof, because of the dielectric heating, as mentioned before.

An increase of the number of the cells causes the cubical expansion of the plastic material to fully occupy the cavity 70. By a further dielectric heating, the expansion pressure of the plastic material exceeds the spring force of the springs 40 provided between the movable portion 32 and the back plate 37, so that the movable portion 32 is moved upward against the spring force until the movable portion 32 come into contact with the back plate 37. Namely, the plastic compound 11 expands during the plasticization thereof, by a volume corresponding to the retraction displacement of the movable portion 32.

In the illustrated embodiment, since the cavity surface 31 of the movable portion 32 is flush with the parting surface 38 of the upper die 33 when the movable portion 32 is retracted, the molded product has a flat surface corresponding to the cavity surface 31.

Finally, the expanded and molten plastic foam is cooled and thereby comes into a desired shape of light plastic foam, for example a plastic molding 10A for an automobile as shown in FIG. 5, after the dielectric heating is stopped. In FIG. 5, the rear surface 12 of the plastic molding 10A corresponds to the cavity surface 31 of the movable portion 32. The plastsic molding thus obtained can be removed from the molding dies 20 and 30 by separating them. When the molding dies 20 and 30 come away from each other, the movable portion 32 is returned to its initial position, i.e. its lowermost position by the dead weight thereof and by the springs 40, so that the movable portion 32 projects from the upper die 30 toward the lower die 20 by a predetermined length.

Figure 3:
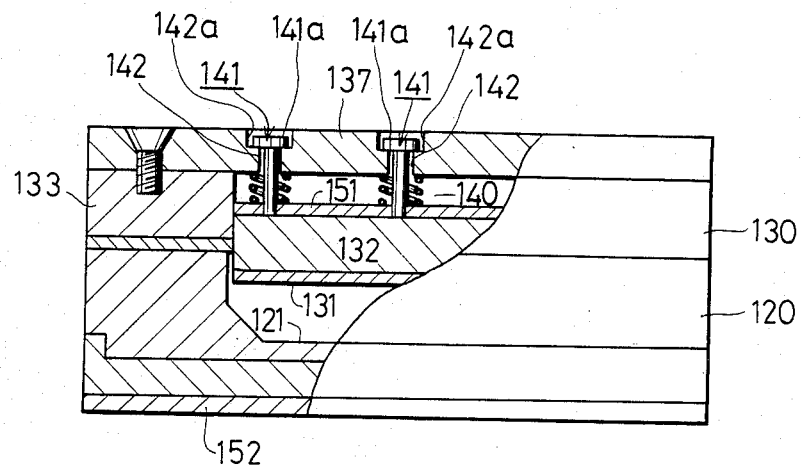
FIG. 3 is a partial sectional view of modified molding dies used in the present invention.

In the embodiment mentioned above, the downward movement of the movable portion 32, i.e. the length of the projection of the movable portion from the upper die body 33 is restricted by the abutments 36 provided in the upper die body 33 which can be engaged by the shoulder portions 34 of the movable portion 32, as described before. Alternatively, as shown in FIG. 3 which shows a second embodiment of the invention, it is also possible to restrict the downward movement of the movable portion 132 toward the lower die 120 by bolts 141 which are secured to the rear surface of the movable portion 32 through insertion holes 142 formed in the back plate 137 of the upper die 130. The bolts 141 has enlarged heads 141a which come into abutment with the shoulder portions 142a of the insertion holes 142 to restrict the downward movement of the movable portion 132. Springs 140 which surround the bolts 141 are provided between the back plate 137 and the movable portion 132 to continuously bias the movable portion 132 toward the lowermost position in which the projection length of the movable portion 132 from the upper die body 133 is maximum. The numerals 120, 121, 131, 151 and 152 designate the lower die, the lower cavity surface, the upper cavity surface, the upper electrode, and the lower electrode, which correspond to those of the first embodiment mentioned above.

Also in the second embodiment, when the high frequency voltage is applied to the plastic compound which is charged in the cavity defined by the upper and lower cavity surfaces 131 and 121, by means of the upper and lower electrodes 151 and 152, the plastic compound is molten to obtain a predetermined shape of a light plastic foam.

Figure 4:
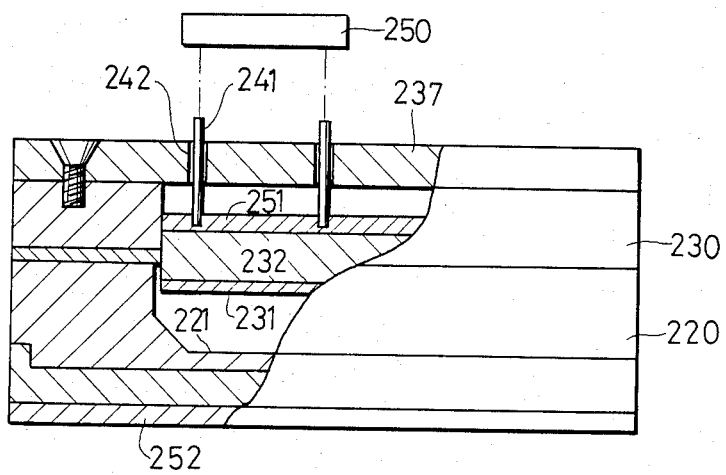
FIG. 4 is a partial sectional view of another molding dies used in the present invention.

FIG. 4 shows another embodiment of the invention. In FIG. 4, the bolts 141 shown in FIG. 3 are replaced with rods 241 which are secured to the movable portion 232. The rods 241 are inserted in corresponding rod insertion holes 242 formed in the back plate 237 of the upper die 230. The rods 242 are connected to a hydraulic actuator 250, such as a hydraulic cylinder device, so that the rods 242 are moved up and down in FIG. 4.

The downward movement of the movable portion 232, i.e. the downward displacement of the rods 241 is restricted by the hydraulic actuator 250. In the modified embodiment shown in FIG. 4, when the plastic compound which is charged in the cavity defined by the upper and lower cavity surfaces 231 and 221 is heated with the high frequency voltage by the upper and lower electrodes 251 and 252 to decompose the chemical foaming agent, the cubical expansion of the plastic material is absorbed by the upward movement of the movable portion 232 which is moved upward by the rods 241. Namely, the hydraulic actuator 250 operates to move the rods 241 upward to absorb the expansion of the plastic material in the mold cavity. During the upward movement of the movable portion 232 by the hydraulic actuator 250, the cavity surface 231 of the movable portion 232 is kept in surface contact with the molten plastic material, so that a predetermined shape of a mold product can be obtained, similarly to the aforementioned embodiments.

Figure 6:
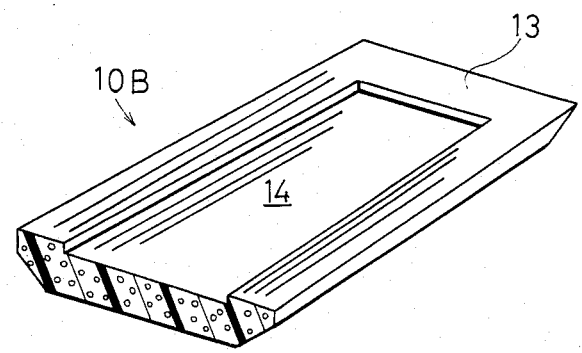

FIG. 5 and 6 show a different type of plastic molding for an automobile which are obtained by the mentioned above. The molding 10A shown in FIG. 5 has a flat bottom 12 and the molding 10B shown in FIG. 6 has a bottom 13 with a recess 14. The recess 14 of the molding 10B can be formed by controlling the retraction, i.e. the upward movement of the movable portion 32 (or 132 or 232) in FIG. 2 (FIG. 3 or 4) to a limited position in which the movable portion slightly projects from the parting plane of the upper die body toward the lower die. The depth of the recess 14 can be controlled by controlling the projection of the movable portion from the parting plane of the upper die body. Alternatively, it is also possible to obtain a molding having a bottom with a projection instead of the recess 14 by retracting the movable portion 32 (132 or 232) past the spring plane of the upper die body.

It is also possible to form a plastic foam with a decorative layer integrally therewith by placing a decorative material, such as a decorative film on the cavity surface of the lower die in advance. Alternatively, it is possible to obtain a plastic foam with a plastic clip which is at its one end, embedded in the plastic foam by locating the plastic clip on the cavity surface of the upper die in advance.

The following shows examples of the plastic compounds used in the present invention.

EXAMPLE 1

| | parts by weight |
| --- | --- |
| polyvinyl chloride | 100 parts |
| dioctyl phthalate | 15 parts |
| epoxy-type plasticizer | 10 parts |
| barium-zinc-type stabilizer | 4 parts |
| azodicarbonamide | 5 parts |
| pigment | a predetermined amount |

The mean specific gravity of the products which were obtained by the method of the invention mentioned above and which were made of the plastic compound of the Example 1 was 0.60.

EXAMPLE 2

| | parts by weight |
| --- | --- |
| polyvinyl chloride | 100 parts |
| dioctyl phthalate | 20 parts |
| ester-type polymetric plasticizer | 10 parts |
| barium-zinc-type stabilizer | 3 parts |
| azodicarbonamide | 3 parts |
| pigment | a predetermined amount |

The plastic compound of the Example 2 was extruded by an extrusion molding machine into a plate form at a temperature below the decomposing temperature of the chemical foaming agent. The plate like blanks thus obtained were used to form the plastic molding products. The mean specific gravity of the products was 0.64.

As can be seen from the above discussion, according to the present invention, the plastic compound is molten and plasticized in the molding cavity by the dielectric heating to decompose the chemical foaming agent in order to obtain a predetermined shape of mold products. In the course of the molding process mentioned above, the movable portion which is provided in one of the upper and lower molding dies is moved so as to keep the movable portion in a surface contact with the plastic compound which is expanded during the dielectric heating.

Since there is no air gap between the plastic composition charged in the molding cavity and the cavity surfaces according to the present invention, the high frequency voltage produced between the electrodes can be directly and effectively used to heat the plastic compound. The effective utilization of the heat energy enables the plastic composition to be heated with a relatively low voltage in comparison with the prior art.

According to the present invention, since one of the cavity surfaces is moved to come away from the other cavity surface in accordance with the cubical expansion of the plastic compound in the molding cavity, as mentioned before, unlike the prior art, the cavity increases in volume and accordingly, the mold products have an increased foaming ratio.

Since one of the cavity surfaces is moved away from the other cavity surface while keeping in contact with the plastic compound in the molding cavity, the plastic compound can be continuously and effectively heated with a relatively low voltage.

This also contributes to a production of plastic moldings having a high foaming ratio. Furthermore, according to the present invention, since the dielectric heating takes place inside the plastic compound, the products obtained in the present invention have a higher foaming ratio at the core portions thereof, and have dense skins which are formed by the destruction of the cells of the surface layers under the pressure of the decomposing gas, resulting in a production of mold products having a good appearance with a smooth puter surface.

Furthermore, the mold products obtained by the present invention can be advantageously used as plastic moldings for automobiles, since they are light, inexpensive, agreeable to the touch and have a high damping effect.

It should be appreciated that the device of the present invention can be simply embodied by providing a movable upper or lower cavity surface substantially without a special modification in design.

We claim:

1. A method for manufacturing thermoplastic resin foam having a predetermined shape, in which a polar thermoplastic resinous compound having a chemical foaming agent which produces a gas by a heat decomposition thereof is charged into a molding cavity which is defined by opposing cavity surfaces and said resinous compound is subjected to a dielectric heating, so that said resinous compound is molten and plasticized and the chemical foaming agent is decomposed, characterized in that the cavity surfaces define the shape of an automobile molding and that one of said cavity surfaces is movable to withdraw from and to move closer to the other cavity surface so as to vary the volume of the molding cavity, said resinous compound being charged into the molding cavity, so that said resinous compound is brought into surface contact with the cavity surfaces without an air gap between said resinous compound and the cavity surfaces, said movable cavity surface being moved, in response to the expansion of said resinous compound caused by the decomposition of the chemical foaming agent during heating, in order to maintain contact with and to accommodate the cubically expanding resinous compound, wherein the obtained thermoplastic resin foam contains a core portion having a comparatively low density and a shell portion having a comparatively high density, and the obtained foam is in the form of an automobile molding.

2. A method according to claim 1, wherein said movable cavity surface is continuously biased by a spring, so that when said resinous compound expands during heating, the movable cavity surface is moved away from the other cavity surface against the spring by the expansion of said resinous compound.

3. A method according to claim 1, wherein said movable cavity surface is connected to an actuator for moving it in accordance with the expansion of said resinous compound.

4. A method according to claim 1, wherein said resinous compound charged into the molding cavity is compressed by the movable cavity surface prior to heating thereof.

5. A method according to claim 3, wherein the movement of the movable cavity surface in accordance with the expansion of said resinous compound in the molding cavity is controlled by the actuator.

* * * * *